June 30, 1953  W. H. RIGHTER  2,643,518
VEHICLE BRAKE CONTROL APPARATUS
Filed Aug. 13, 1949
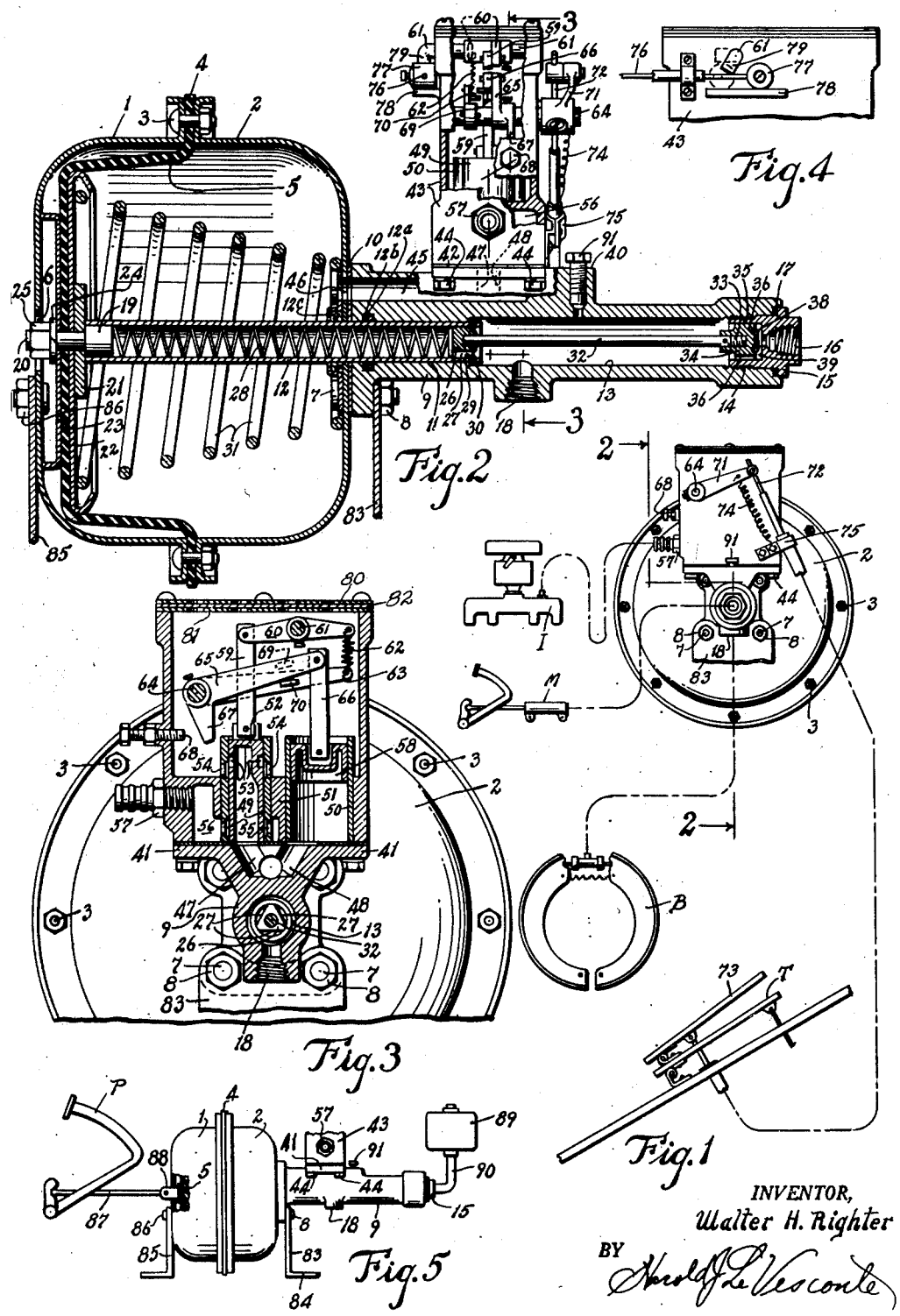
INVENTOR,
Walter H. Righter
BY
Harold J. LeVesconte
ATTORNEY.

Patented June 30, 1953

2,643,518

UNITED STATES PATENT OFFICE 2,643,518

VEHICLE BRAKE CONTROL APPARATUS

Walter H. Righter, Glendale, Calif.

Application August 13, 1949, Serial No. 110,185

15 Claims. (Cl. 60—54.5)

This invention relates to control apparatus for braking motor vehicles and particularly to an improved form thereof which is operated either directly by the throttle pedal of a vehicle or by a pedal overlying the throttle pedal and operated by the same foot.

It has been established by experiments that the average driver has a reaction time of 0.75 second and in the case of some drivers, the reaction time factor may be much longer. In driving a conventional motor vehicle and upon sensing the need for coming to a quick stop or to quickly slow down the vehicle, the first action of the driver is to let up on the foot operated throttle and then shift the same foot to the brake pedal to apply the brakes. The present invention aims to employ only the first of these two steps with a resultant saving of the time required to shift the foot from the throttle pedal to the brake pedal and to move the brake pedal downwardly in the initial application of the brakes. The time thus saved is that time in which the vehicle is moving at its highest speed and, consequently, is the most important time to be saved in an emergency, since the distance travelled in coming to a stop will be most greatly reduced by saving time during this particular period. It is obvious that by this quicker application of the brakes, a collision will in many instances either be completely avoided, or at least the damage and liability to personal injury will be greatly reduced.

Another common type of motor vehicle accident is that caused by leaving the vehicle parked on an incline without having set the hand brakes sufficiently. This type of accident most commonly arises in the case of delivery vehicles from which many momentary stops are made. The present invention, in addition to its brake operating function while the vehicle is in motion, also operates automatically to set the brakes at any time when the vehicle is left standing with the motor running, and with the throttle pedal and the operating means therefor allowed to assume a position of rest.

Specifically, this invention relates to novel brake control apparatus embodying control means of the general type disclosed in my prior application, Ser. No. 68,713, filed December 31, 1948, but is simplified in that the piston rod of the vacuum cylinder serves also as a piston means for a hydraulic master cylinder in the main hydraulic brake line; thus eliminating the necessity for a mechanical operating connection between the vacuum cylinder and the brake pedal.

This desirable simplification may be accomplished in either of two ways hereinafter to be disclosed in detail. In one form of the invention, the vacuum operated hydraulic cylinder is disposed in series in the main hydraulic line between the conventional pedal operated master cylinder and the brake cylinders, while in another form, the brake pedal is directly connected to one end of the vacuum cylinder piston rod and the conventional pedal operated master cylinder is eliminated.

The principal object of the invention is to provide a vacuum operated brake control means for motor vehicles which is controlled by means associated with the throttle pedal and in which the vacuum cylinder piston rod serves also as a hydraulic piston; thus eliminating all mechanical linkage between the vacuum cylinder and the manual brake operating means which, heretofore, has characterized prior art constructions.

Another object of the invention is to provide a vacuum actuated brake operating means having the above characteristics and which is so constructed and arranged that the vehicle brakes are applied at all times when the vehicle motor is running and the operating means for the throttle is not depressed beyond a predetermined extent.

Still another object of the invention is to provide brake operating means having the above characteristics and which includes means for automatically shutting off the pedal operated master cylinder as an incident to the operation of the vacuum operated master cylinder.

Still another object of the invention is to provide a vacuum operated master cylinder for motor vehicle braking system which is so constructed and arranged that the brake operating foot pedal may be directly connected to the combined piston rod for the vacuum and hydraulic cylinders.

A further object of the invention is to provide a vacuum operated brake control apparatus including a single piston rod for both the vacuum cylinder and the hydraulic cylinder and including means whereby the vacuum cylinder and control means therefore may be rendered inoperative, while maintaining the capacity for normal manual operation of the vehicle braking system.

A still further object of the invention is to provide a vacuum operated brake control means for motor vehicles which is so constructed and arranged that it may be combined with the conventional brake system of the vehicle and in which the conventional pedal operated master cylinder of the system is cut off from the braking system during the vacuum actuated braking operation.

A still further object of the invention is to provide a vacuum operated brake applying apparatus controlled by the conventional throttle pedal or by a pedal superimposed upon the conventional throttle pedal, and so constructed that the braking effort developed thereby may be augmented or overpowered by depressing the conventional foot brake pedal.

With the above objects in view, together with such other objects and advantages as may subsequently appear, the invention resides in the parts, and in the construction, combination, and arrangement of parts described, by way of example, in the following specification and illustrated in the accompanying drawing forming a part of said specification and in which drawing:

Fig. 1 is an end elevation of an organized apparatus embodying one mode of the execution of the invention with certain portions of the vehicle with which the apparatus is operatively connected shown diagrammatically, Fig. 2 is an enlarged, longitudinal, medial, sectional view through the vacuum and hydraulic cylinders; the control means being shown in full lines with portions of the housing and operating parts of said means being broken away for clearness of illustration as indicated by the staggered line 2—2 of Fig. 1, Fig. 3 is a transverse sectional view taken on the staggered line 3—3 of Fig. 2.

Fig. 4 is a fragmentary side elevation of the housing for the control means showing details of the control disabling device, and, Fig. 5 is a side elevation of a modified form of the device in which the brake pedal is directly connected to the common piston rod for the vacuum and hydraulic cylinders with consequent elimination of the conventional pedal operated master cylinder.

Referring to Figs. 1 to 4, inclusive, of the drawing, the device comprises a vacuum cylinder formed of a pair of cup shaped elements 1 and 2 connected together at their rims by a series of bolts 3, and engaging the rim 4 of a flexible diaphragm 5 so that the edge of the diaphragm serves as a gasket between the adjacent edges of the elements 1 and 2. The element 1 in its base is provided with an opening 6 which is open to atmospheric pressure and the element 2 is secured by bolts 7 and nuts 8 to one end of a body member 9 with an interposed gasket 10. The body member 9 at the end thereof adjacent the vacuum cylinder is provided with a bore 11 in the axial line of the vacuum cylinder which affords guidance for the hollow piston rod 12 of the vacuum cylinder. An O ring 12$^a$ seated in a groove 12$^b$ in the body member 9 serves to seal the piston rod bearing against the escape of hydraulic fluid and a felt washer 12$^c$ carried by the cylinder element 2 serves to exclude foreign matter from the piston rod bearing. This bore beyond the end of the piston rod, when the rod is fully retracted, is enlarged as at 13 and continues to the opposite end of the body member 9 at which point it is threaded as at 14 to receive a plug element 15 having an internally threaded axial bore 16 adapted to receive a hydraulic fitting by which it is connected through suitable tubing, not shown, to a conventional master cylinder M of the vehicle. Preferably a gasket means 17 is interposed between the plug element 15 and the body member 9 to prevent the leakage of hydraulic fluid. Adjacent the inner end of the bore 11, the body member 9 is provided with an internally threaded port 18 by which it may be connected to the line or lines leading to the vehicle brakes B.

The end of the piston rod 12 opposite the end within the body member 9 is closed by a plug 19 brazed or otherwise secured thereto, and the plug is provided with an integral stud portion 20 projecting beyond the end of the piston rod. Mounted on this stud in order reading from the end of the piston rod to the end of the end of the stud is an assembly comprising a washer 21, a piston head element 22, the diaphragm 5, a stop member 23, a lock washer 24, and a nut 25 threaded on to the stud 20 to hold the entire assembly clamped against the end of the piston rod 12.

Slidably mounted within the hollow piston rod 12 is a guide member 26 cut away on three sides as shown in Fig. 3 to provide passages 27 for the movement of fluid into and out of the hollow piston rod incident to movement of the guide member 26 and the piston rod relative to each other. A compression spring 28 housed within the hollow piston rod and extending from the inner end of plug 19 and the opposed face of the guide member 26 tends consequently to move the guide member 26 toward the open end of the piston rod 12 and a snap ring 29 seated in a groove 30 adjacent this end of the piston rod serves to keep the guide member 26 from being ejected from the piston rod 12. As is conventional in vacuum cylinders, a compression spring 31 extending between the end face of the cylinder member 2 and the piston head 22 tends normally to maintain the piston and piston rod retracted as shown in Fig. 2 with the stop plate 23 engaging the interior face of the member 1. Brazed or otherwise secured to the guide member 26 and extending the length of the bore 13 of the cylinder is a rod 32 which at the end opposite the guide member 26 is threaded as at 33 to receive a valve element 34 slidably mounted in an annular recess 35 in the inner end of the plug element 15. The valve element has a series of longitudinal grooves 36 on its side face and on its outer end face is provided with an annular, centrally disposed groove 37 in which a resilient sealing ring 38 is mounted with the outer surface of the ring extending slightly beyond the end face of the valve element and adapted to engage the end wall 39 of the recess 35. The length of the piston rod 12 and the rod 32 and the adjustment of the valve element 34 thereon is such that when the piston rod is completely retracted by the action of the spring 31 as shown in Fig. 2, the snap ring 29 engaging the guide member 26 will hold the valve element 34 slightly unseated. Thus, upon the first slight forward motion of the vacuum cylinder piston and the piston rod incident to a vacuum actuated braking operation, the sealing ring 38 will be seated against the end wall 39 and the continued movement of the vacuum cylinder piston and the piston rod will act to compress the spring 28 as the piston rod advances relative to the stationary guide member 26 with the hydraulic fluid within the piston rod being caused to flow past the guide member 26, through the passages 27, incident to such movement.

Adjacent its point of connection with the vacuum cylinder, the body member 9 is provided with a flat upper face 40 including laterally extending flange portions 41, 41 and mounted on said flange portions with an interposed gasket 42, is the housing 43 for the control means. Screws 44 passing through the flanges 41, 41, and threaded into the lower portion of the housing 43 serve to secure the housing to the body member 9. Disposed in the body member 9 offset from, but parallel to the axial bores 11 and 13, is an air passage 45 which at one end is in registry with an opening 46 in the end wall of the vacuum cylinder member 2, and which adjacent its other end communicates with a pair of diagonally upwardly extending passages 47 and 48 which communicate at their opposite ends with the interiors of guiding sleeves 49 and 50 respectively, which guiding sleeves are mounted in a partition member 51 extending across the lower portion of the housing 43. Slidably mounted in the sleeve 49 is an elongated hollow piston element 52 having ports 53, 53 at its upper end adapted to move into and out of registry with ports 54, 54 in the side wall of the sleeve 49, and these ports communicate with the atmosphere within the upper end of the housing. The sleeve 49 adjacent its lower end is provided with a pair of ports 55, 55 which communicate with a chamber 56 in the lower end of the housing and a fitting 57 provides a means by which the chamber 56 is brought into communication with the intake manifold 1 of the vehicle motor. When the piston element 52 is raised, so that the lower end thereof clears the ports 55, 55, the air will be exhausted from the interior of the vacuum cylinder permitting atmospheric pressure to enter the opening 6 and move the piston forward with the piston rod 12 and creating hydraulic pressure in the cylinder formed by the bores 11 and 13. At the same time this negative air pressure will be applied to the interior of the sleeve 50 below the piston 58 slidably mounted therein so that atmospheric pressure applied to the upper end of this piston will tend to move it downwardly.

The upper end of the piston 52 is connected by a link 59 to one end of a rocker arm 60 and this rocker arm is mounted intermediate on its ends on shaft 61 journalled in the side walls of the housing 43. At its other end the rocker arm 60 is connected by a tension spring 62 to the free end of an arm 63 freely mounted in a rock shaft 64, also journalled in the side walls of the housing 43. Also mounted on and fixed to the shaft 64 within the housing is a second arm 65, the free end of which is connected by a link 66 to the piston 58 and this arm is also provided with a depending lug 67 adapted to engage an adjustable stop screw 68 extending through an end wall of the housing 43 to limit the extent of travel of the arm 65. The arm 65 is provided near its outer end with a laterally extending lug 69 adapted at times to engage an underlying laterally extending lug 70 carried by the arm 63 in a manner and for a purpose to be later explained in detail.

Exteriorly of the housing, the shaft 64 carries an arm 71 which is connected by a flexible member 72 of the Bowden cable type to a foot pedal 73 hinged to and overlying the throttle pedal T and movable with the throttle pedal as that pedal is employed to operate the throttle and movable toward and away from the throttle pedal when the latter is in the idling position. A tension spring 74 extending between the arm 71 and a mounting bracket 75 for the end of the cable 72 operates constantly to tend to move the pedal 73 away from the throttle pedal.

The operation of the device is as follows:

Assuming that the vehicle is in motion and that the throttle pedal is depressed to the desired extent to supply motive power and that it is desired to bring the vehicle to a stop, the pressure on the throttle pedal is released and the overlying pedal 73 is moved away from the throttle pedal. This movement will rock the shaft 64 in a clockwise direction as viewed in Figs. 1 and 3, and the lug 69 on the arm 65 will engage the lug 70 on the arm 63 causing the arm 63 to be moved with the arm 65 and thus causing the spring 62 to rock the rock member 60 and shaft 61 in a clockwise direction. This will lift the piston element 52 from the position shown in Fig 3 sufficiently to uncover the ports 55 and the suction from the manifold will then exhaust the air from the vacuum cylinder causing the atmospheric pressure to move the piston rod 12 forward into the body member 9 and displace the hydraulic fluid contained therein out of the port 18 and thence to the brake cylinders. As an incident to the first portion of this movement, the valve member 35 will cut off any fluid flow or pressure to the master cylinder M. As the vacuum within the vacuum cylinder increases, atmospheric pressure will be applied to the upper face of the piston 58 which is directly connected to the rock shaft 64, through the arm 65 and thus the rock shaft through the member 72 will apply a definite outward thrust on the pedal 73 in proportion to the degree of vacuum with the vacuum cylinder. At the same time, atmospheric pressure operating on the top of the piston element 52 will tend to try to move it downwardly, cutting off the ports 55; this force being opposed by the existing tension in the spring 62 and thus the farther the shaft 64 is rotated clockwise by the release on the brake pedal 73, the more the spring 62 will be extended, the higher the vacuum that will be required to cause the piston 52 to cut off the ports 55 with the resultant greater pressure on the pedal 73 and the increased hydraulic pressure produced on the brakes. Thus it is that the brake pedal offers a load-feel type of reaction to the driver, which is indicative of the braking force being expended. The purpose of the adjusting screw 68 is to limit the extent to which the shaft 64 can be rotated by the action of the brake pedal and thus to limit the extent to which the spring 62 can be extended with resultant limitation on the braking effort that can be employed. In the different vehicles, the efficiency of the braking apparatus and the weight of the vehicle makes it necessary to have an adjustment so that each installation can be properly adjusted to the requirements of the individual vehicle.

It will be noted that, if desired, during a vacuum braking operation, an augmented braking effort can be applied by the master cylinder M and the brake pedal since any increased pressure developed by foot pressure will tend to unseat the valve element 34 allowing the higher fluid pressure thus developed to be applied.

At the end of a braking operation, when the vehicle is again to be moved, the downward pressure on the pedal 73 will cause the shaft 64 to be rotated in a counterclockwise direction, relieving the load on the arm 63 and moving the piston 52 to the position shown in Fig. 2 in which the ports 55 are cut off from the vacuum cylinder, and the ports 53 and 54 are brought into registry so that atmospheric pressure is established through these ports to the vacuum cylinder, whereupon the spring 31 will cause the vacuum cylinder piston to be moved to its position of rest with incident retraction of the piston rod 12. To prevent the entrance of foreign matter with the air passing into and out of the vacuum cylinder, the open upper end of the house 43 is preferably provided with a filter means comprising in the present instance, a pair of perforated metal plates 80 and 81 secured to the upper end of the housing 43 with a suitable filter element such as a sheet of felt 82 located between them.

Also, the vacuum operated braking apparatus may be disabled by means shown in Fig. 4, comprising a Bowden type cable 76, one end of which is attached to a suitable control means on the dash of the vehicle, and the other end of which is attached to a cam element 77, slidably mounted on a ledge 78 on the side face of the housing 43. The shaft 61 projects through the side wall of the housing above the ledge 78 and terminates in a depending portion 79. On moving the cam 77 to the left as viewed in Fig. 4, the shaft 61 will be rotated in a clockwise direction as viewed in that figure, or in a counter-clockwise direction as viewed in Fig. 3, and the shaft will be locked in that position. Thereafter, any movement of the shaft 64 through the pedal 73 by the means already described will merely result in extension and contraction of the spring 62 but the piston element 52 will be seated as shown in Fig. 2 and will not be lifted to permit the air within the vacuum cylinder to be exhausted and any movement of the vacuum piston or piston rod will be accompanied by the free passage of air through the ports 53 and 54 which are then in registry. With the control mechanism thus disabled, the brakes can then be operated by the brake pedal and master cylinder M with the fluid flowing from the master cylinder through the bore 13 and out of port 18 to the brakes and back again when the brakes are released.

The mounting for the apparatus comprises a bracket member 83 having a foot portion 84 and having a pair of holes at its opposite end and adapted to be entered by any adjacent pair of the bolts 7 which secure the body member 9 to the vacuum cylinder as best shown in Fig. 2. In this manner, the bracket 83 may be positioned as shown in Fig. 2, or it may be extended laterally to either side as may be found most desirable for individual vehicles. Additionally, or alternatively, the mounting may comprise or include a second bracket 85 which is attached to the end portion of the vacuum cylinder member 1 by bolts 86 in the same general manner as is employed for the bracket 83 so that this bracket also may be positioned at different angles relative to the apparatus. In general, such bracket mountings and the capacity for securing the brackets to the vacuum cylinders at different angular positions is well known in the art.

Referring now to the modified form of the invention shown in Fig. 5, the general arrangement of the component parts is the same as disclosed in the first described embodiment of the invention and the same numbers have been applied to all similar parts. In this form of the invention, the conventional normal pedal operated master cylinder has been dispensed with, and the brake pedal P is directly connected by a rod 87 to a clevis 88 carried by the end of the piston rod assembly. Since the make-up reservoir normally carried by the master cylinder has been eliminated by the elimination of the master cylinder, a make-up reservoir 89 is provided which is connected to the plug element 15 by a suitable tube 90. Thus, when the device is at rest, the valve element 34 is unseated and any additional fluid that may be required will enter the brake cylinder in the member 9 past this valve element and when the brakes are to be applied either by the brake pedal, or by the vacuum cylinder, the first portion of the braking stroke will cause the valve element to seal off the make-up reservoir in the same manner as the master cylinder is sealed off in the first described embodiment of the invention. In both forms of the invention, the control means within the housing 43 is exactly the same and the mode of operation and control of the vacuum actuated braking operation is the same and need not be repeated. In both forms of the invention, a bleed screw 91 is provided to enable entrapped air to be removed from the hydraulic cylinder in the body member 9 incident to the installation of the device, or to the addition of hydraulic fluid.

In use, the operation of the apparatus is quick and reliable, and for ordinary stops, it will operate as readily as the conventional foot operated brakes, while for emergency stops it will reduce the time for brake operation materially, and as previously pointed out, the portion of time saved is that time at which the vehicle is moving at the rate of speed in existence at the time the emergency was sensed, and obviously, any time saved at this particular period will contribute more to cutting down the distance travelled before the vehicle is brought to a stop than any other corresponding period of time in the braking operation.

It will be appreciated that while the device, as shown, includes a separate control pedal superimposed on the throttle pedal, a construction best suited for installation on existing vehicles, it may be equally well controlled by a direct connection to the throttle pedal with the inclusion of a suitable lost motion connection between the pedal and the throttle, examples of which are well known in the art.

While in the foregoing specification, I have disclosed certain specific modes of execution of my invention, I do not intend thereby to limit myself to the exact forms there disclosed, and the invention includes all such modifications in the parts and in the construction, combination, and arrangement of parts, as shall come within the purview of the appended claims.

I claim:

1. A vacuum operated vehicle brake actuating apparatus comprising a vacuum cylinder having a reciprocable piston and piston rod; a hydraulic cylinder mounted on said vacuum cylinder and disposed in co-axial relation thereto; said piston rod serving as the piston for said hydraulic cylinder, and pedal controlled devices constructed and arranged to control the action of said vacuum cylinder and including a second vacuum responsive piston directly connected to the controlling pedal and effective to produce a reaction on said controlling pedal which is indicative of the magnitude of a braking effort.

2. A vacuum operated brake actuating apparatus for vehicles having a hydraulic braking system comprising manually operated master cylinder and a plurality of wheel brake cylinders operatively connected to the master cylinder; said apparatus comprising, a hydraulic cylinder disposed in series between the master cylinder and the brake cylinders of the vehicle, a piston in said hydraulic cylinder, a vacuum cylinder having a piston operatively connected to said hydraulic cylinder piston, and pedal operated devices including a second vacuum responsive piston movable in unison with the pedal of said devices interposed between a source of vacuum and said vacuum cylinder effective to control the operation of said vacuum cylinder piston.

3. In a brake operating apparatus for motor vehicles, a vacuum cylinder and a hydraulic brake operating cylinder mounted in end to end co-axial relation, a diaphragm and piston head in said vacuum cylinder, a piston rod connected at one end to said diaphragm and piston head; the distal end of said piston rod serving as the piston for said hydraulic cylinder, a make up reservoir connected to said hydraulic cylinder, valve means actuated by said piston rod effective to shut off said reservoir during a braking operation, and manual control devices constructed and arranged to regulate the braking effort of said vacuum cylinder; said valve means being constructed and arranged to be held in closed position by the pressure developed in a braking operation.

4. In a brake operating apparatus for motor vehicles having in combination a plurality of wheel brake cylinders, a vacuum cylinder and a hydraulic brake operating cylinder mounted in end to end co-axial relation, a diaphragm and piston head in said vacuum cylinder, a piston rod connected at one end to said diaphragm and piston head; the distal end of said piston rod serving as the piston for said hydraulic cylinder, a brake pedal and devices operated thereby also operatively connected to the brake cylinders, manual control devices constructed and arranged to regulate the braking effort of said vacuum cylinder, and manually operable means effective to render said vacuum cylinder operative or inoperative at the will of the driver while maintaining the brake pedal and devices operated thereby operatively connected to the brake cylinders.

5. In a brake operating apparatus for motor vehicles, a vacuum cylinder and a hydraulic brake operating cylinder mounted in end to end co-axial relation, a diaphragm and piston head in said vacuum cylinder, a piston rod connected at one end to said diaphragm and piston head; the distal end of said piston rod serving as the piston for said hydraulic cylinder, a port at the distal end of said hydraulic cylinder adapted to be connected to a pedal operated master cylinder, a second port in said hydraulic cylinder adapted to be connected to the brake cylinder line of the vehicle, a valve seat adjacent said first port, and a valve element carried by said piston and arranged to yieldingly engage said seat when said vacuum cylinder is actuated and by such engagement to seal off the master cylinder of the vehicle during a vacuum actuated braking operation.

6. In a brake operating apparatus for motor vehicles, a vacuum cylinder and a hydraulic brake operating cylinder mounted in end to end co-axial relation, a diaphragm and piston head in said vacuum cylinder, a piston rod connected at one end to said diaphragm and piston head; the distal end of said piston rod serving as the piston for said hydraulic cylinder, a port at the distal end of said hydraulic cylinder adapted to be connected to a pedal operated master cylinder, a second port in said hydraulic cylinder adapted to be connected to the brake cylinder line of the vehicle, a valve seat adjacent said first port, and a valve element carried by said piston and arranged to yieldingly engage said seat when said vacuum cylinder is actuated and by such engagement to seal off the master cylinder of the vehicle during a vacuum actuated braking operation; said yielding engagement between said valve element and said seat being constructed and arranged to permit the master cylinder of the vehicle to be used additively to the vacuum actuated hydraulic cylinder in a braking operation.

7. In a brake operating apparatus for motor vehicles, a vacuum cylinder and a hydraulic brake operating cylinder mounted in end to end co-axial relation, a diaphragm and piston head in said vacuum cylinder, a piston rod connected at one end to said diaphragm and piston head; the distal end of said piston rod serving as the piston for said hydraulic cylinder, a spring operative normally to position said piston and piston rod in retracted position, a port in said cylinder affording means of connection with a source of make-up fluid, a valve seat on the cylinder side of said port, a valve element in said cylinder operatively connected with the distal end of said piston rod; said connection being so constructed and arranged that said element will be yieldingly engaged with said seat during a vacuum actuated braking operation and will be disengaged from said seat when said piston rod is fully retracted by said spring.

8. In a brake operating apparatus for motor vehicles, a vacuum cylinder and a hydraulic brake operating cylinder mounted in end to end co-axial relation, a diaphragm and piston head in said vacuum cylinder, a piston rod connected at one end to said diaphragm and piston head; the distal end of said piston rod serving as the piston for said hydraulic cylinder, and manual control devices constructed and arranged to regulate the braking effort of said vacuum cylinder; said control devices including a foot pedal, a valve operatively connected to said foot pedal and interposed between a source of vacuum and said vacuum cylinder, a lost motion connection between said pedal and said valve; said pedal being adapted to serve as the vacuum brake operating means only when moving in the vicinity of one end of its path of travel.

9. In a brake operating apparatus for motor vehicles, a vacuum cylinder and a hydraulic brake operating cylinder mounted in end to end co-axial relation, a diaphragm and piston head in said vacuum cylinder, a piston rod connected at one end to said diaphragm and piston head; the distal end of said piston rod serving as the piston for said hydraulic cylinder, manual control devices including a foot pedal constructed and arranged to regulate the braking effort of said vacuum cylinder; said control devices including a movable, vacuum responsive element directly connected to said foot pedal and effective to produce a reaction on the foot pedal indicative of the magnitude of the braking effort.

10. In a brake operating apparatus for motor vehicles, vacuum brake operating means comprising a vacuum cylinder and a hydraulic brake operating cylinder mounted in end to end co-axial relation, a diaphragm and piston head in said vacuum cylinder, a piston rod connected at one end to said diaphragm and piston head; the distal end of said piston rod serving as the piston for said hydraulic cylinder, manual control devices constructed and arranged to regulate the braking effort of said vacuum cylinder; said control devices including a foot pedal connected to the vacuum brake operating means by an interposed lost motion connection, and a movable element responsive to vacuum in said vacuum cylinder effective through said lost motion connection to produce a reaction on said pedal indicative of the magnitude of the braking effort.

11. In a brake operating apparatus for motor vehicles, a vacuum cylinder and a hydraulic brake operating cylinder mounted in end to end co-axial relation, a diaphragm and piston head in said vacuum cylinder, a piston rod connected at one end to said diaphragm and piston head; the distal end of said piston rod serving as the piston for said hydraulic cylinder, a spring operative normally to position said piston and piston rod in retracted position, a port in said cylinder affording means of connection with a source of make-up fluid, a valve seat on the cylinder side of said port, a valve element in said cylinder operatively connected with the distal end of said piston rod; said connection being so constructed and arranged that said element will be yieldingly engaged with said seat during a vacuum actuated braking operation and will be disengaged from said seat when said piston rod is fully retracted by said spring, and manual control devices constructed and arranged to regulate the braking effort of said vacuum cylinder.

12. In a brake operating apparatus for motor vehicles, a vacuum cylinder and a hydraulic brake operating cylinder mounted in end to end co-axial relation, a diaphragm and piston head in said vacuum cylinder, a piston rod connected at one end to said diaphragm and piston head; the distal end of said piston rod serving as the piston for said hydraulic cylinder, a spring operative normally to position said piston and piston rod in retracted position, a port in said cylinder affording means of connection with a source of make-up fluid, a valve seat on the cylinder side of said port, a valve element in said cylinder operatively connected with the distal end of said piston rod; said connection being so constructed and arranged that said element will be yieldingly engaged with said seat during a vacuum actuated braking operation and will be disengaged from said seat when said piston rod is fully retracted by said spring, manual control devices constructed and arranged to regulate the braking effort of said vacuum cylinder; said control devices including a foot pedal constructed and arranged to serve as the vacuum brake operating means when being moved in the vicinity of one end only of its path of travel, and a movable element responsive to vacuum in said vacuum cylinder interconnected with said pedal to produce a reaction on said pedal indicative of the magnitude of the braking effort.

13. A vacuum operated vehicle brake actuating apparatus comprising a vacuum cylinder having a reciprocable piston and piston rod, a hydraulic cylinder mounted on said vacuum cylinder and disposed in co-axial relation thereto; said piston rod serving as the piston for said hydraulic cylinder, and devices including a pedal movable toward and away from the floor of the vehicle constructed and arranged to control the action of said vacuum cylinder and including vacuum responsive means effective to produce a reaction on the controlling pedal which is indicative of the magnitude of a braking effort, said controlling pedal serving as the brake controlling means only when being moved in that portion of its range of movement which is remote from the vehicle floor.

14. In a brake operating apparatus for motor vehicles, a vacuum cylinder and a hydraulic brake operating cylinder mounted in end to end co-axial relation, a diaphragm and piston head in said vacuum cylinder, a piston rod connected at one end to said diaphragm and piston head; the distal end of said piston rod serving as the piston for said hydraulic cylinder, a port at the distal end of said hydraulic cylinder adapted to be connected to a pedal operated master cylinder, a second port in said hydraulic cylinder adapted to be connected to the brake cylinder line of the vehicle, a valve seat adjacent said first port, a valve element carried by said piston and arranged to yieldingly engage said seat when said vacuum cylinder is actuated and by such engagement to seal off the master cylinder of the vehicle during a vacuum actuated braking operation, and pedal operated control devices carried by said hydraulic cylinder operative to connect and disconnect said vacuum cylinder with a source of negative pressure.

15. In a brake operating apparatus for motor vehicles, a vacuum cylinder and a hydraulic brake operating cylinder mounted in end to end co-axial relation, a piston element in said vacuum cylinder, a piston rod having one end attached to said piston element and the other end serving as the piston for said hydraulic cylinder, manually operable devices for controlling the braking effort exerted by said vacuum cylinder, and other manually operable devices effective to render said vacuum cylinder operable or inoperable at the will of the driver.

WALTER H. RIGHTER.

References Cited in the file of this patent

UNITED STATES PATENTS

| Number | Name | Date |
|---|---|---|
| 1,887,428 | Powell | Nov. 8, 1932 |
| 1,918,025 | Frankford | July 11, 1933 |
| 2,301,219 | Leupold | Nov. 10, 1942 |
| 2,305,638 | Rockwell | Dec. 22, 1942 |
| 2,336,374 | Stelzer | Dec. 7, 1943 |
| 2,359,687 | Stelzer | Oct. 3, 1944 |
| 2,373,272 | Stelzer | Apr. 10, 1945 |
| 2,393,524 | Fant | Jan. 22, 1946 |
| 2,405,852 | Rockwell | Aug. 13, 1946 |
| 2,458,803 | Stelzer | Jan. 11, 1949 |
| 2,502,378 | Gunderson | Mar. 28, 1950 |